United States Patent
Imai

(10) Patent No.: US 7,821,959 B2
(45) Date of Patent: Oct. 26, 2010

(54) BANDWIDTH MEASURING METHOD AND DEVICE

(75) Inventor: Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 11/972,686

(22) Filed: Jan. 11, 2008

(65) Prior Publication Data

US 2008/0181125 A1 Jul. 31, 2008

(30) Foreign Application Priority Data

Jan. 31, 2007 (JP) .............................. 2007-021766

(51) Int. Cl.
*H04L 12/26* (2006.01)

(52) U.S. Cl. .................................... 370/252; 370/232

(58) Field of Classification Search ................ 370/230, 370/232, 233, 236, 252, 253, 381, 388, 395, 370/412, 413, 437, 468
See application file for complete search history.

(56) References Cited

U.S. PATENT DOCUMENTS

| | | | | |
|---|---|---|---|---|
| 5,691,975 A | * | 11/1997 | Hamada et al. | ............. 370/232 |
| 5,850,385 A | * | 12/1998 | Esaki | ................... 370/395.21 |
| 6,996,064 B2 | * | 2/2006 | Klassen et al. | .............. 370/238 |
| 2005/0021830 A1 | * | 1/2005 | Urzaiz et al. | ................ 709/234 |
| 2007/0008883 A1 | * | 1/2007 | Kobayashi | .................. 370/230 |

FOREIGN PATENT DOCUMENTS

| | | |
|---|---|---|
| JP | 2002-118557 | 4/2002 |
| JP | 2004-254164 | 9/2004 |

* cited by examiner

*Primary Examiner*—Kwang B Yao
*Assistant Examiner*—Andrew Lai
(74) *Attorney, Agent, or Firm*—Katten Muchin Rosenman LLP

(57) ABSTRACT

In a bandwidth measuring method and device for grasping a traffic general and local trends in consideration of a packet loss, without continuously capturing packets, a simulation is executed by determining a bandwidth limit based on a buffer length, a transmission bandwidth, and a mean packet length collected in an adjoining node or its own node and information of a preset allowable packet loss rate, and by determining an initial value of a transient evaluation type queue simulation for a packet loss rate. An optimum short time interval when the packet loss rate by the simulation approaches the allowable packet loss rate is determined as a packet continuous capture time. Furthermore, packets are continuously captured in the short time interval, and a mean bandwidth of the packets is calculated, so that a general mean bandwidth, or an upper bandwidth or a peak bandwidth is determined from an overall mean bandwidth by repeating the continuous capturing at random within a fixed section.

14 Claims, 16 Drawing Sheets

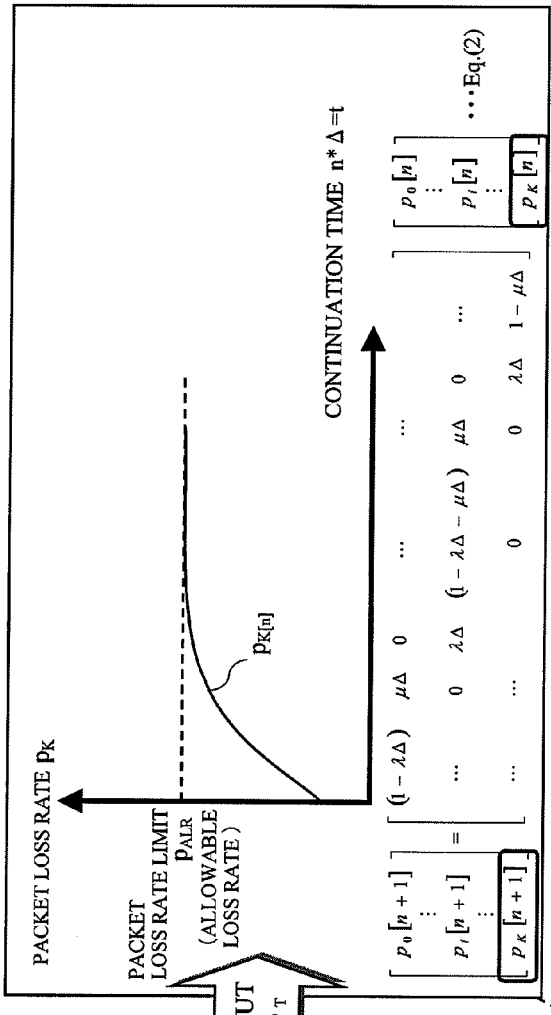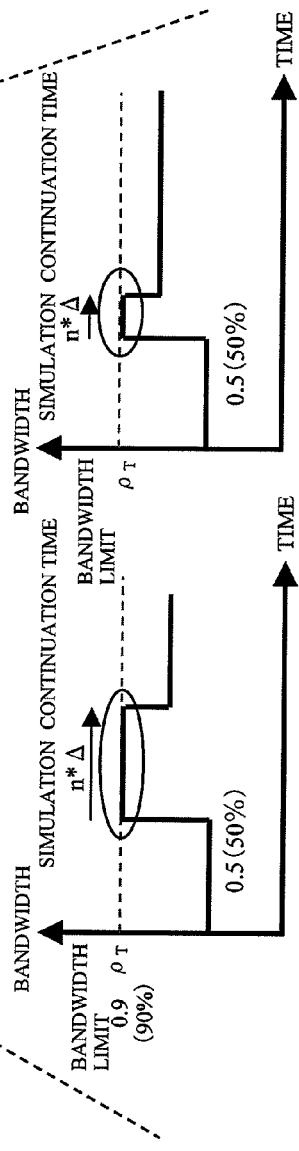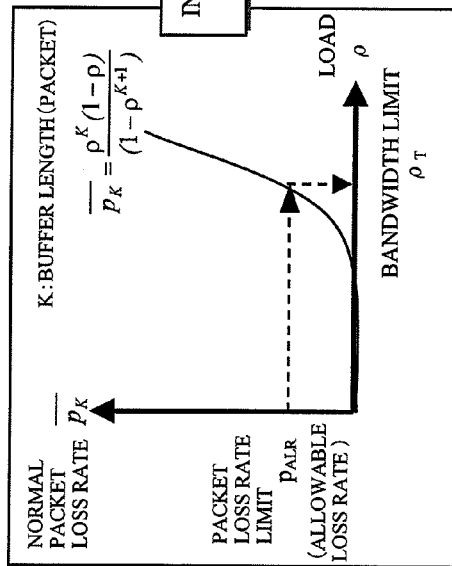

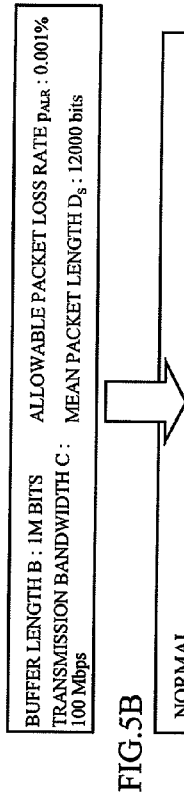
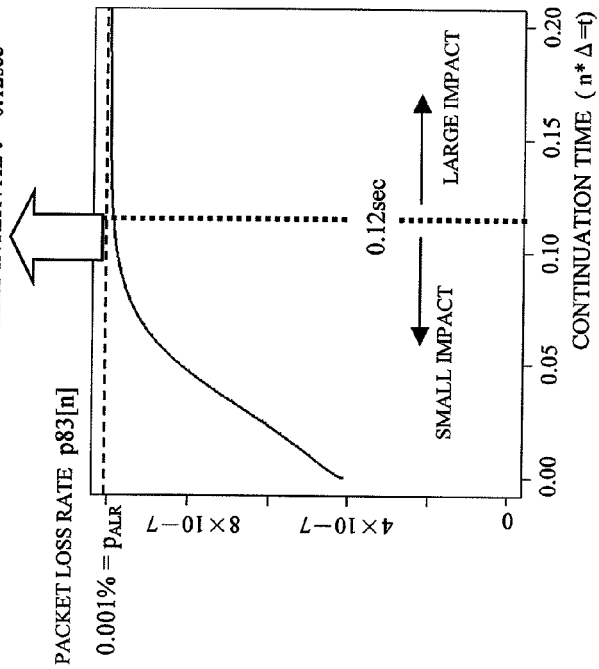
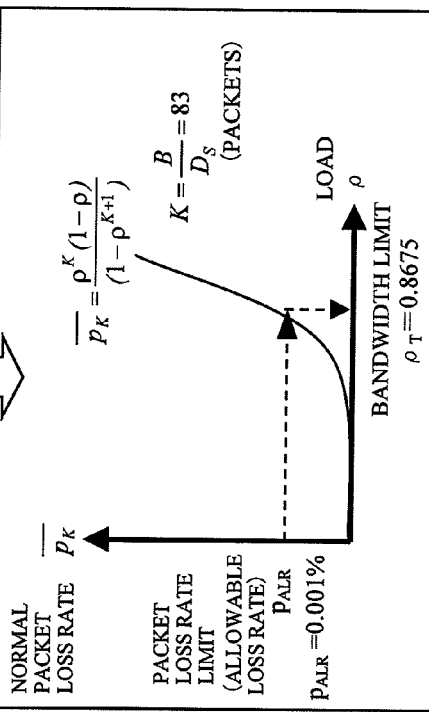

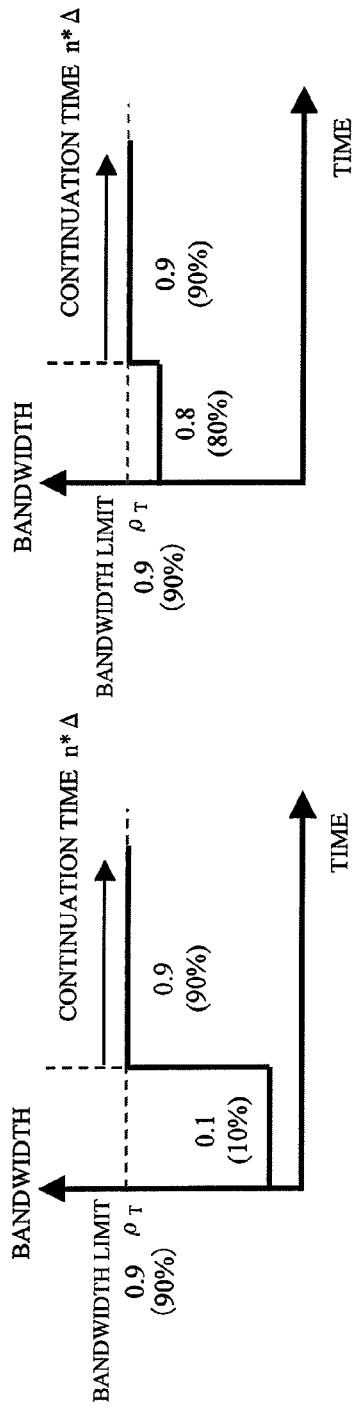
FIG.6A PATTERN 1
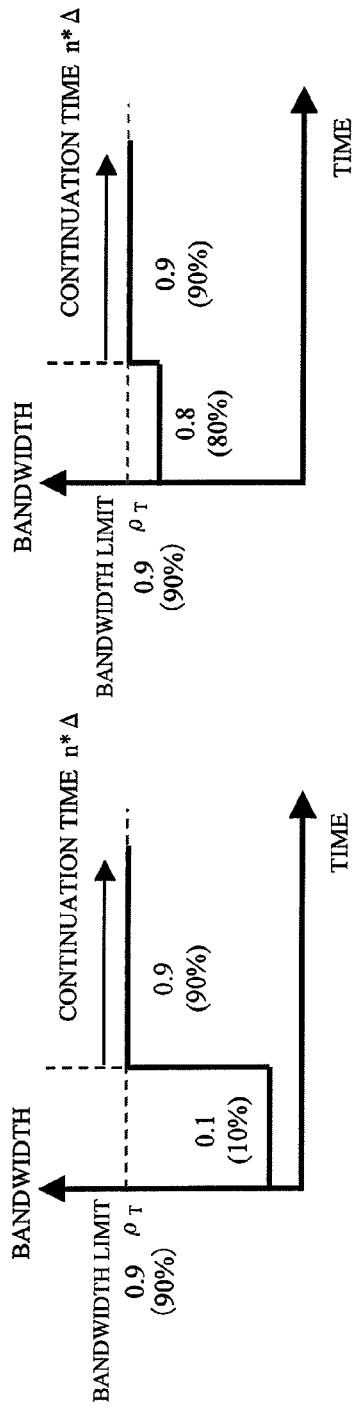
FIG.6B PATTERN 2
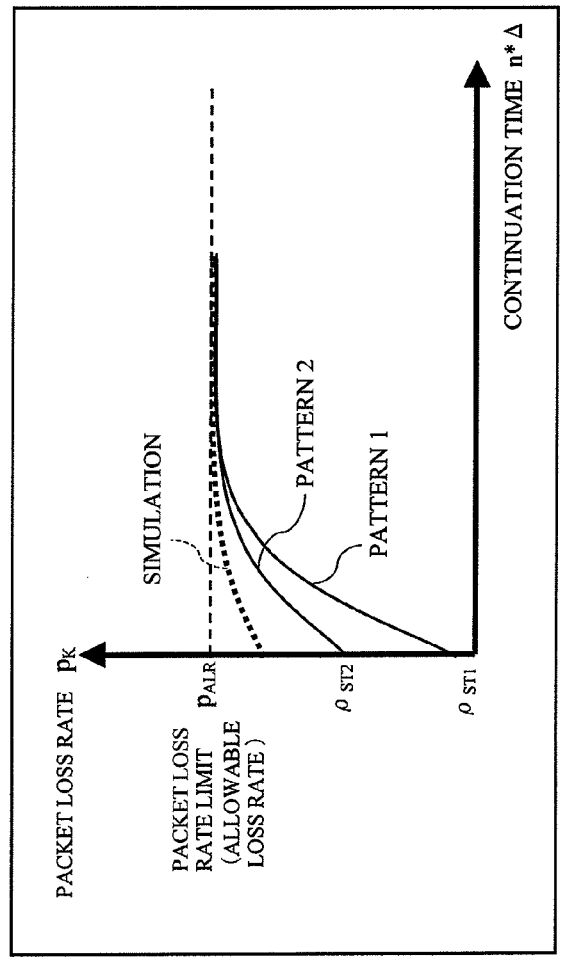
FIG.6C

FIG.7A $$\mu = \frac{C}{D_S} \quad \lambda = \rho_T * \mu \quad K = \frac{B}{D_S} \quad \text{(B: BUFFER LENGTH, C: TRANSMISSION BANDWIDTH, } D_S\text{: MEAN PACKET LENGTH, } \rho_T\text{: BANDWIDTH LIMIT)}$$

n : TIME WITH SHORT TIME Δ BEING MADE UNIT TIME $$\begin{bmatrix} p_0[n+1] \\ \vdots \\ p_i[n+1] \\ \vdots \\ p_K[n+1] \end{bmatrix} = \begin{bmatrix} (1-\lambda\Delta) & \mu\Delta & 0 & \cdots & \cdots & \cdots \\ \lambda\Delta & (1-\lambda\Delta-\mu\Delta) & \mu\Delta & 0 & \cdots & \cdots \\ 0 & \lambda\Delta & (1-\lambda\Delta-\mu\Delta) & \mu\Delta & 0 & \cdots \\ \vdots & & & & & \\ \cdots & 0 & 0 & \lambda\Delta & 1-\mu\Delta \end{bmatrix} \begin{bmatrix} p_0[n] \\ \vdots \\ p_i[n] \\ \vdots \\ p_K[n] \end{bmatrix} \quad \cdots \text{Eq.(2)}$$

PACKET LOSS RATE AT TIME "n+1" ← PROBABILITY OF STATE WHERE "K" PACKETS ARE CONTAINED IN BUFFER LENGTH "K" → PACKET LOSS RATE AT TIME "n"

FIG.7B

SIMULATION INITIAL VALUE $$\begin{bmatrix} p_0[0] \\ \vdots \\ p_i[0] \\ \vdots \\ p_K[0] \end{bmatrix} = \begin{bmatrix} \dfrac{(1-\rho_{st})}{1-\rho_{st}^{K+1}} \\ \vdots \\ \dfrac{\rho_{st}^{i}(1-\rho_{st})}{1-\rho_{st}^{K+1}} \\ \vdots \\ \dfrac{\rho_{st}^{K}(1-\rho_{st})}{1-\rho_{st}^{K+1}} \end{bmatrix} \quad \cdots \text{Eq.(3)'}$$

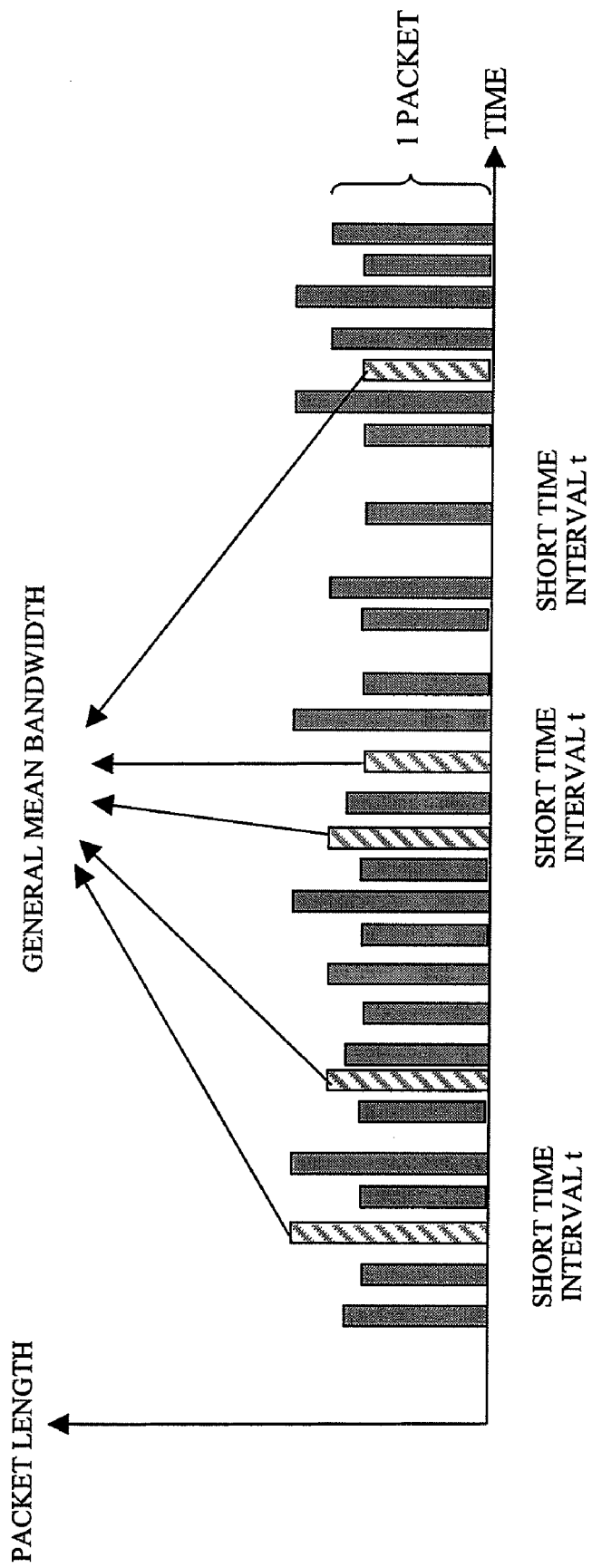

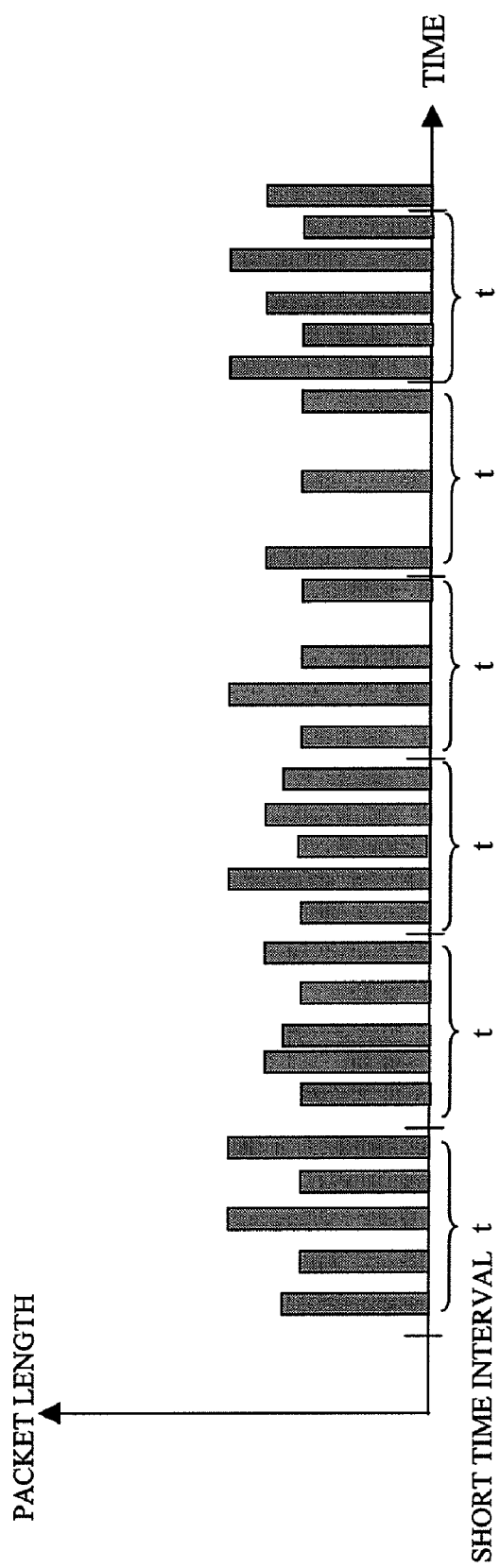

BANDWIDTH MEASURING METHOD AND DEVICE

BACKGROUND OF THE INVENTION

1. Field of the Invention

The present invention relates to a bandwidth measuring method and device. In particular the present invention relates to a bandwidth measuring method and device which monitor a traffic trend and evaluate an impact to a flow quality (packet loss).

2. Description of the Related Art

In order to evaluate an impact to a flow quality of packets which flow over a network, not only a general (long-term) mean or average transition of an overall traffic but also a local (short-term) traffic change is required to be grasped. For grasping such a traffic trend, the following prior art methods have been well known:

(1) Continuous Packet Capturing Method

This is a method of continuously capturing all of the packets to grasp a traffic trend.

Advantage

Since all of the packets are captured, a local packet behavior which may have an impact on the flow quality can be grasped.

Problem

Since the packet capture depends on a memory and a processing load, there is a limit to a capacity and a time for allowing continuous capturing.

(2) Statistic Sampling (SFlow/NetFlow) Method: FIG. 15

This is a method, as shown in FIG. 15, of grasping a general packet behavior of a traffic by statistically performing thinned-out sampling (shown by hatched lines) to packets to be captured.

Advantage

It is possible to reduce a capturing load because all of the packets are not required to be captured, so that a general traffic trend can be grasped with a small memory.

Problem

A local packet behavior which may have an impact on the flow quality can not be grasped.

For the above-mentioned methods (1) and (2), there have been proposed methods (link available bandwidth management method and bandwidth expansion timing estimating method), as shown in FIG. 16, in which a link available state is measured per short time "t" by measuring a traffic with an external device or module different from a network device, and a bandwidth expansion timing is estimated by extracting the number of times when the traffic in a short section "t" exceeds a threshold in each link (transmission line) set (see e.g. patent document 1).

Also, there has been proposed a bandwidth monitoring device which has a threshold for starting a probabilistic violation determination, a tilt value for determining its discard probability, and a monitor counter, wherein all of the packets are determined to be a monitor bandwidth violation when an amount exceeds a certain threshold (see e.g. patent document 2).

[Patent document 1] Japanese patent application laid-open No. 2002-118557

[Patent document 2] Japanese patent application laid-open No. 2004-254164

In the patent document 1, the short time unit for measuring the traffic is practically determined within a range of a memory, failing to take account of an impact to an application such as an actual packet loss. Although data per short time is aggregated, this technology is based on the premise that all of the packets are captured, so that the capture load is still large.

The patent document 2 is also based on the premise that all of the packets are captured. This is a technology of determining the bandwidth violation of an individual traffic (local traffic) such as a burst traffic, but not a technology used for grasping a trend of an overall traffic behavior, so that the capture load is large.

SUMMARY OF THE INVENTION

It is accordingly an object of the present invention to provide a bandwidth measuring method and device for grasping a general and local trends of a traffic considering a packet loss without continuously capturing packets.

In order to achieve the above-mentioned object, a bandwidth measuring method (or device) according to the present invention comprises: a first step of (or first determining portion) determining an initial value of a transient evaluation type queue simulation for a packet loss rate by determining a bandwidth limit based on a buffer length, a transmission bandwidth, and a mean packet length collected in an adjoining node or its own node and information of a preset allowable packet loss rate, and executing the simulation; and a second step of (or second determining portion) determining an optimum short time interval when the packet loss rate by the simulation approaches the allowable packet loss rate as a packet continuous capture time.

In the above-mentioned case, the bandwidth measuring method (or device) may further comprise a step of (or capturing portion) continuously capturing packets in the short time interval to calculate a mean bandwidth of the packets, a step of (or repeating portion) repeating the continuous capture at random within a fixed section, and a step of (or determining portion) determining a general mean bandwidth or a local upper bandwidth or peak bandwidth from an overall mean bandwidth determined within the fixed section.

Namely, according to the present invention, based on a buffer length, a transmission bandwidth, a mean packet size collected, and an allowable packet loss rate set by an operator, an initial value of a transient evaluation type queue simulation is determined, and the simulation is executed, so that a short time interval "t" which is optimum for evaluating the packet loss rate is calculated. The short time interval "t" is reflected to capture scheduling.

Accordingly, it becomes possible to grasp a general bandwidth transition with a smaller number of samples compared with a method of capturing all of the packets, and to grasp a local bandwidth transition.

Also, not by holding individual packet information, but by holding only a mean amount in or during the short time interval "t" to be collected over a certain fixed section T (>t), it becomes possible to efficiently grasp a local bandwidth change with less memory amount.

Also, by a linear approximate prediction from the transition of the local bandwidth change, an impact to a future packet loss can be evaluated.

Also, since the limit of the loss rate for maintaining the quality is explicitly provided, a threshold for the measured bandwidth based on the limit can be automatically provided. Therefore, a determination by the threshold can be used for a control trigger.

Furthermore, by identifying an application based on header information of an individual packet measured in a short time section, not only a general behavior of each application flow but also a local behavior can be grasped.

In the present invention, a program is further provided for making a computer execute: a first step of determining an initial value of a transient evaluation type queue simulation for a packet loss rate by determining a bandwidth limit based on a buffer length, a transmission bandwidth, and a mean packet length collected in an adjoining node or its own node and information of a preset allowable packet loss rate, and executing the simulation; and a second step of determining an optimum short time interval when the packet loss rate by the simulation approaches the allowable packet loss rate as a packet continuous capture time.

The above-mentioned program can make the computer further execute a step of continuously capturing packets in the short time interval to calculate a mean bandwidth of the packets, a step of repeating the continuous capture at random within a fixed section, and a step of determining a general mean bandwidth or a local upper bandwidth or peak bandwidth from an overall mean bandwidth determined within the fixed section.

Furthermore, according to the present invention, a computer readable recording medium for recording the above-mentioned program is provided.

By the present invention, it is made possible to measure a mean bandwidth considering an impact to a local packet loss. Also, by repeating a continuous packet capturing at random in a short time interval, it becomes possible to efficiently grasp both of a local behavior and a general behavior of a traffic with a reduced processing load.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 4A-4D are graphs in which a relationship between a bandwidth and a packet loss rate in the present invention is modeled;

FIGS. 5A-5D are diagrams showing an embodiment of an algorithm used for the present invention;

FIGS. 6A-6C are graphs illustrating an impact of an initial value of a transient evaluation type queue simulation used for the present invention;

FIGS. 7A and 7B are diagrams showing an initial value of a transient evaluation type queue simulation used for the present invention;

FIG. 15 is a diagram showing a prior art example known as a statistic sampling method; and FIG. 16 is a diagram showing a prior art example known as a bandwidth expansion timing estimation method.

DESCRIPTION OF THE EMBODIMENTS a. Arrangement of Embodiment

Figure 1:
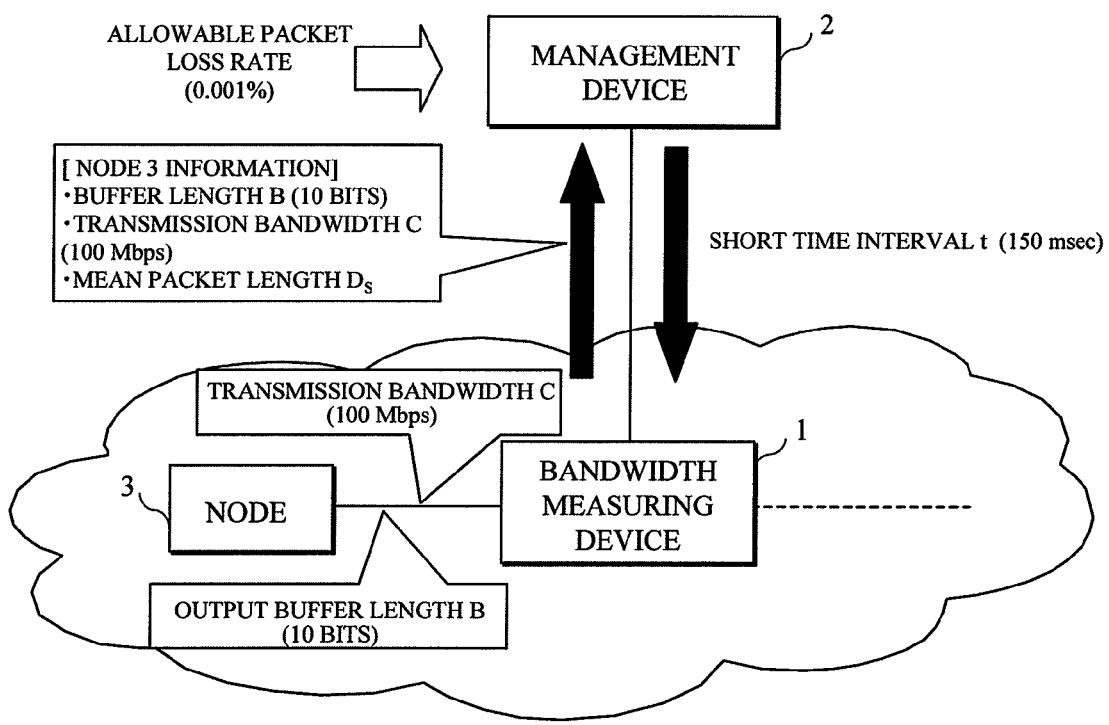
FIG. 1 is a block diagram showing a schematic arrangement of a bandwidth measuring method and device according to the present invention.
Figure 2:
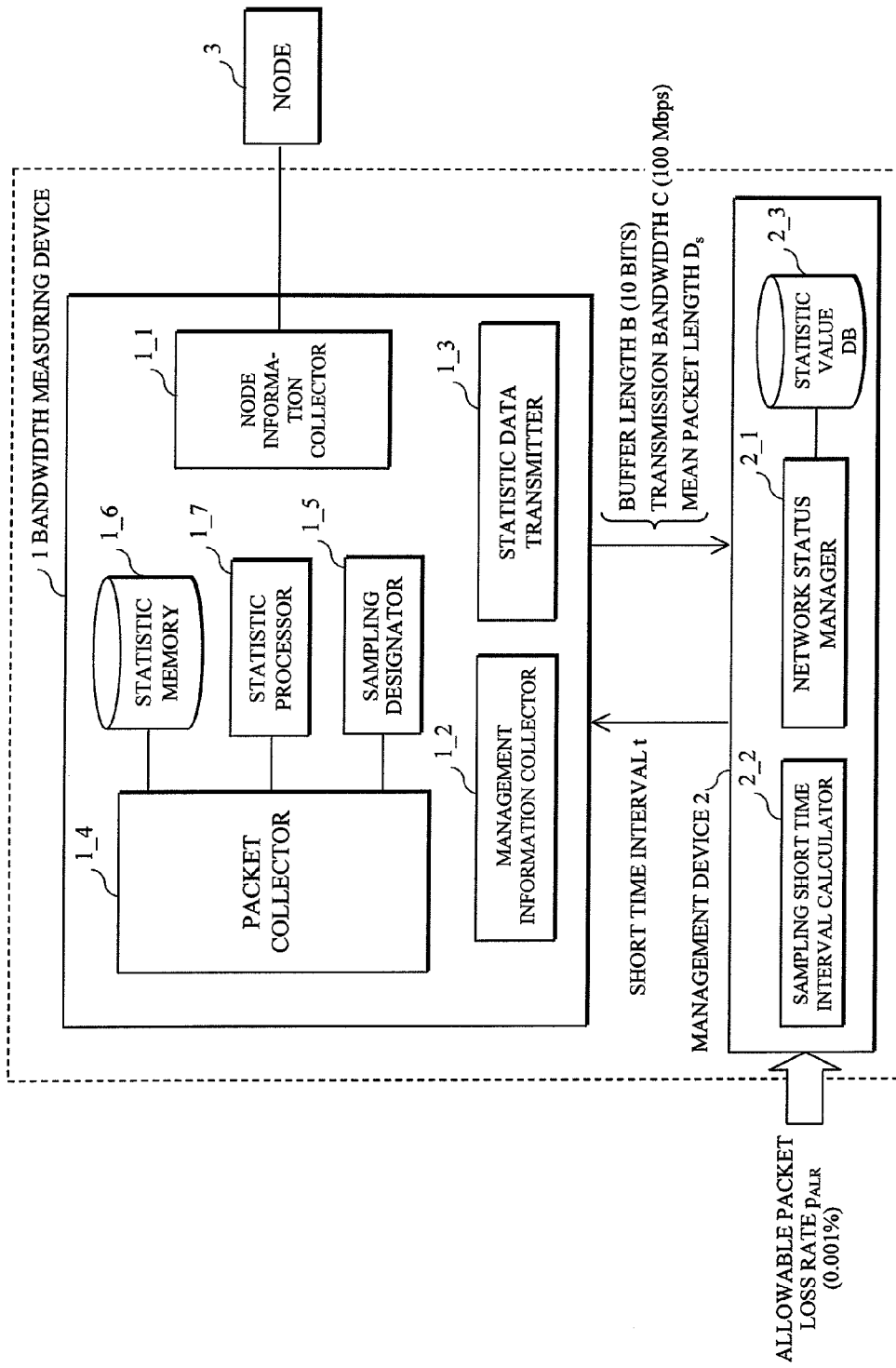
FIG. 2 is a block diagram more specifically showing the arrangement of FIG. 1.

FIGS. 1 and 2

FIG. 1 shows a schematic arrangement of an embodiment of a bandwidth measuring method and device according to the present invention. In FIG. 1, a reference numeral 1 indicates a bandwidth measuring device, and a reference numeral 2 indicates a management device for managing the bandwidth measuring device 1.

In this embodiment, a system is arranged such that the bandwidth measuring device 1 continuously samples packets from an adjoining node 3 in a sampling short time interval "t" designated by the managing device 2, and grasps a local bandwidth change which may have an impact on an application quality in an object network by repeatedly measuring the packets at random. It is to be noted that the functions of the bandwidth measuring device 1 and the management device 2 may be integrated as shown by a dotted line.

FIG. 2 specifically shows the bandwidth measuring device 1 and the management device 2 in the system shown in FIG. 1. These devices 1 and 2 are composed of the following portions respectively:

(1) Bandwidth Measuring Device 1

A node information collector 1_1 collects information of a transmission buffer length and a transmission bandwidth (link bandwidth) in the adjoining node 3 or its own node, and notifies the information to the management device 2 through a statistic data transmitter 1_3.

A management information collector 1_2 collects setting information from the management device 2.

The statistic data transmitter 1_3 notifies the information collected and measured by the bandwidth measuring device 1 to the management device 2.

A packet collector 1_4 has a function of capturing a packet, and collects the size (packet length) of the packet and a measured time. Furthermore, the packet collector 1_4 continuously captures packets only in the short time interval (t) set by a sampling short time interval designator 1_5 of the management device 2, and repeats the capturing in the short time interval (t) at random. Also, bandwidth information and a mean packet length measured in each short time section are stored in a statistic memory 1_6.

The sampling designator 1_5 schedules the packet capturing in the packet collector 1_4 based on the short time interval (t) calculated by a sampling short time interval calculator 2_2 in the management device 2 and an interval of random sampling automatically calculated.

The statistic memory 1_6 holds statistic values measured.

A statistic processor 1_7 acquires the bandwidth information in the short time interval from the statistic memory 1_6, calculates, from the mean and the variance of the bandwidth, a transition amount of a general mean bandwidth and a transition amount of an upper or a peak bandwidth, and then transmits the information of the transition amount to a network status manager 2_1 of the management device 2.

(2) Management Device 2

The network status manager 2_1 monitors a quality status of the network based on the general bandwidth transition amount and the transition amount of the upper or the peak bandwidth notified from the bandwidth measuring device 1.

The sampling short time interval calculator 2_2 executes a queue simulation based on the buffer length, the transmission bandwidth, and the mean packet length notified from the bandwidth measuring device 1 as well as information of an allowable packet loss rate set by an operator, thereby calculating an optimum short time interval and setting the time interval in the bandwidth measuring device 1.

A statistic database (DB) 2_3 holds a past general bandwidth transition amount and the transition amount of the upper or the peak bandwidth notified from the bandwidth measuring device 1.

b. Operation of Embodiment

FIGS. 3-14C

Figure 3:
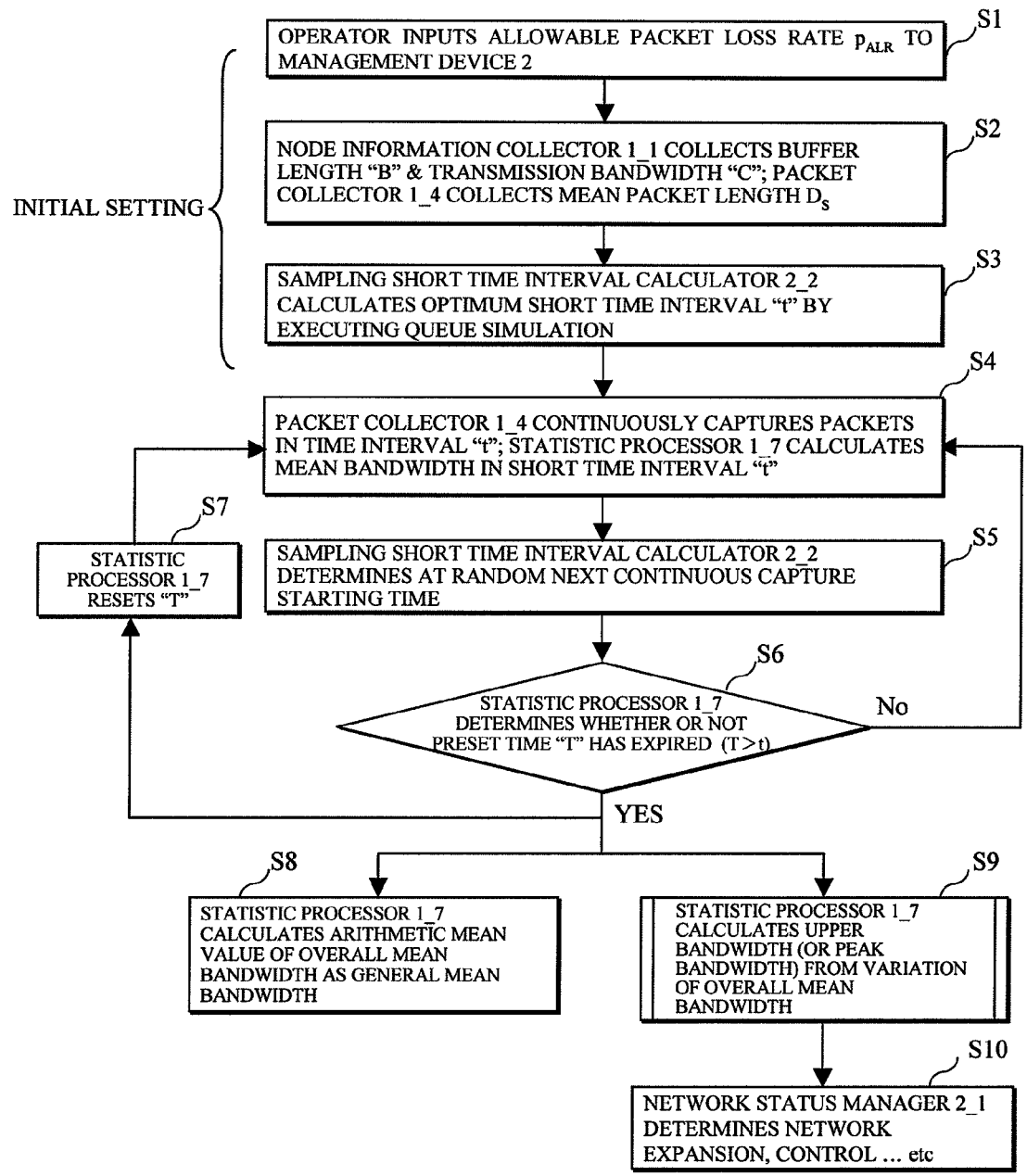
FIG. 3 is a flowchart showing a basic processing of a bandwidth measuring method and device according to the present invention.

FIG. 3 shows a basic processing flow of the embodiment shown in FIG. 2. Hereinafter, steps of this flow will be sequentially described.

Step S1

An operator sets an "allowable packet loss rate $p_{ALR}$" (occasionally referred to as packet loss rate limit) for guaranteeing an application quality for the management device 2.

Step S2

The node information collector 1_1 collects an "output buffer length B" and a "link capacity (transmission bandwidth) C" in the adjoining node 3 or its own node. The packet collector 1_4 collects a "mean packet size (mean packet length) $D_S$" measured and stored in the statistic memory 1_6.

Step S3

Based on the parameter obtained at step S2, the sampling short time interval calculator 2_2 executes a transient evaluation type queue simulation, thereby calculating an optimum short time interval "t".

It is to be noted that the above-mentioned steps S1-S3 are initial setting steps executed before operation.

Step S4

In the bandwidth measuring device 1, the packet collector 1_4 continuously captures packets in the short time interval "t" determined, and the statistic processor 1_7 calculates the mean bandwidth in the short time interval "t".

Step S5

The sampling short time interval calculator 2_2 determines at random a time of performing the continuous packet capture next.

Step S6

When a time interval T for performing statistic processing for each mean bandwidth acquired has not expired at the capturing time determined or scheduled at step S5 (T>t), the statistic processor 1_7 returns to step S4 and similarly performs the continuous capturing from the time determined at step S5.

Step S7

When the time interval T for performing the statistic processing for each mean bandwidth acquired has already expired at the capturing time determined at step S5 (T<t), the statistic processor 1_7 resets the time interval T, and executes the statistic processing for each mean bandwidth. It is to be noted that based on the number of times of continuous or sequential capturing, timing of the statistic processing may be performed.

Step S8

The statistic processor 1_7 calculates an arithmetic mean value for an overall mean bandwidth sampled in the short time interval "t", thereby calculating a general mean bandwidth.

Step S9

The statistic processor 1_7 calculates the peak or the variance for the overall mean bandwidth sampled in the short time interval "t", thereby grasping a transition of a local upper or peak bandwidth change.

Step S10

The network status manager 2_1 obtains a determination of a bandwidth expansion in the network and a trigger to a control based on the transition of the local upper or peak bandwidth change.

Specific examples in the above-mentioned basic processing flow will now be described.

Processing of Collected Data: Step S2

With the information of a measured mean packet length $D_S$(bit), as shown in FIGS. 5A-5D, the parameters are unified or normalized by the packet as follows:

Buffer length B (bit) ⇒ $B/D_S$(packets)=K
Transmission bandwidth C (bps) ⇒ $C/D_S$(pps)=μ

Transient Evaluation Type Queue Simulation Assuming M/M/1/K: Step S3

Generally, a steady (bandwidth is fixed in a long time interval) traffic is obtained by collecting violent transient behaviors when they are obtained locally.

In fact, it is conceived that the local transient status of the traffic which can not be grasped from the steady traffic behavior makes an impact on a packet loss.

This invention is for deriving an optimum short time interval for calculating the mean bandwidth from the transient traffic behavior. In this embodiment, a general M/M/1 model is assumed as a traffic model, and an algorithm up to determining the short time interval "t" is shown in FIGS. 4A-8.

1) Determination of Bandwidth (Rate) Limit

Firstly, assuming M/M/1/K (K is a buffer length (packets)), the relationship between a normal packet loss rate and the bandwidth (load) is indicated by the following equation:

$$\overline{p_K} = \frac{\rho^K(1-\rho)}{(1-\rho^{K+1})} \qquad \text{Eq. (1)}$$

($\overline{p_K}$ is normal packet loss rate: ρ is bandwidth (load))

This relationship is shown in FIGS. 4A and 5B. As for a load (bandwidth) satisfying the initial setting (C=100 Mbps, B=1 Mbit, $p_{ALR}$=0.001%, and $D_S$=12000 bits), the result of equal to or less than 86.75% is obtained as shown in FIG. 4A.

2) Determination of Short Time Interval "t"

Figure 9:
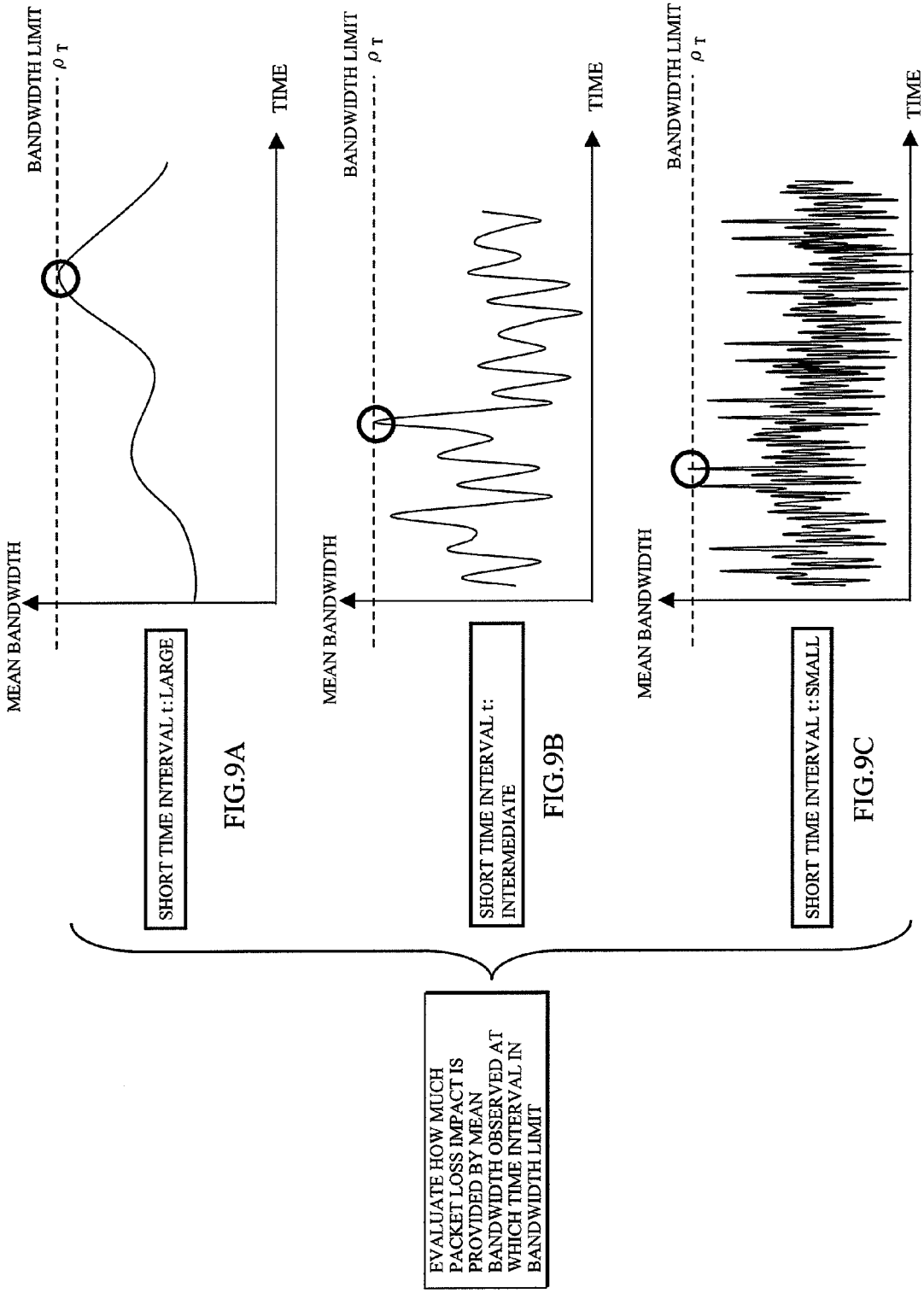
FIGS. 9A-9C are waveform diagrams showing a difference of a mean bandwidth characteristic between a small short time interval and a large short time interval used in the present invention.

The characteristics of the mean bandwidth calculated in the short time interval "t" are greatly different from each other (see FIGS. 9A-9C). In this embodiment, the relationship between the short time interval for calculating the mean bandwidth and the packet loss impact is quantitatively evaluated.

An algorithm for determining a packet loss impact when the mean bandwidth calculated in a certain short time interval "t" [sec] has reached the bandwidth limit will be indicated as follows, where by approximating Markov chain in an ultra-short time Δ in M/M/1/K with a discrete equation, the relationship between the time and the packet loss is derived:

The transient evaluation type queue simulation in this case is expressed by the following equation:

$$\left. \begin{array}{l} p_0[n+1] = (1-\lambda\Delta)p_0[n] + \mu\Delta p_1[n] \\ \vdots \\ p_i[n+1] = \lambda\Delta p_{i-1}[n] + (1-\lambda\Delta-\mu\Delta)p_i[n] + \mu\Delta p_{i+1}[n] \quad (1 \leq i < K) \\ \vdots \\ p_K[n+1] = \lambda\Delta p_{K-1}[n] + (1-\mu\Delta)p_K[n] \end{array} \right\} \quad \text{Eq. (2)}$$

In Eq. (2), $p_i$ ($0 \leq i \leq k$) indicates a status probability of each buffer length (packets) and $p_K$ indicates a packet loss (discard) rate. The Eq. (2) is expressed by a queue equation as shown in FIGS. 4B, 5C, and 7A as well. It is to be noted that the Eq. (2) represents a transition relationship from a time "n" to "n+1" (when time Δ has expired) with respect to the status probability $p_i$ ($0 \leq i \leq k$) in which "i" pieces of packets exist in a single buffer (buffer length=K).

A load ρ is expressed by λ/μ, μ (packet/sec) is expressed by $C/D_S$, and λ (packet/sec) indicates an input mean bandwidth. The transient time behavior of this simulation depends on the initial value of the simulation, so that the initial value which performs a conservative evaluation are supposed to be set.

The embodiment shown in FIGS. 4A-5D represents a result of evaluating the packet loss impact (packet loss rate) when the mean bandwidth calculated per simulation-expired time "n" (0<n) indicates a bandwidth limit $\rho_T$ (FIGS. 4A-4D) and $\rho_T$=86.75% (FIGS. 5A-5D).

The parameters μ (=$C/D_S$), λ (=$\rho_T \times \mu$), K, and the short time Δ in the simulation of the above-mentioned in Eq. (2) are set with values shown in FIG. 5C.

It is to be noted that "n" indicates a time ticked when the short time Δ=0.00001 (short interval on the order of where no packet simultaneous arrival occurs) is made a unit time, and as shown in FIGS. 4C and 4D, indicates a steady continuation time after the time reaches the 90% bandwidth limit from e.g. the 50% bandwidth. By this continuation time, how much packet loss impact is made can be evaluated.

Also, as an initial load $\rho_{ST}$ (0-1) before the bandwidth reaches the bandwidth limit, the time for reaching the packet loss rate limit is shorter (see FIG. 6C) in a case where 0.8 (80%) load is made as an initial value like a pattern 2 in FIG. 6B than in a case where 0.1 (10%) load is made an initial value like a pattern 1 in FIG. 6A. In consideration of this, as shown in FIG. 5C, a value $\rho_{ST}=\rho_T-0.01$=85.75% only considering the change of 1% (empirical value) from the bandwidth limit $\rho_T$ is set here.

From this value, the initial value of each parameter $p_i$ ($0 \leq i \leq k$) can be derived by the following equation:

$$P_i = \frac{\rho^i(1-\rho)}{(1-\rho^{K+1})} \quad \text{Eq. (3)}$$

Since K=$B/D_S$=83 (packets) as shown in FIG. 5B, Eq. (3)' is obtained as shown in FIGS. 5C and 7B. Generally, it is conceived that as the short time interval "t" is made shorter, the load reaches the load limit by a much larger load change (change from a small initial load). Since the conceived case becomes smaller in the risk of the packet loss than the present change evaluation from −1%, more conservative evaluation is performed.

The result of the simulation shown in FIG. 5D indicates the short time interval "t" upon calculating the packet loss rate on the ordinate and upon calculating the mean bandwidth on the abscissa, where it can be confirmed that as the short time interval "t" becomes longer, the packet loss rate is converging on an allowable loss rate 0.0001.

Figure 8:
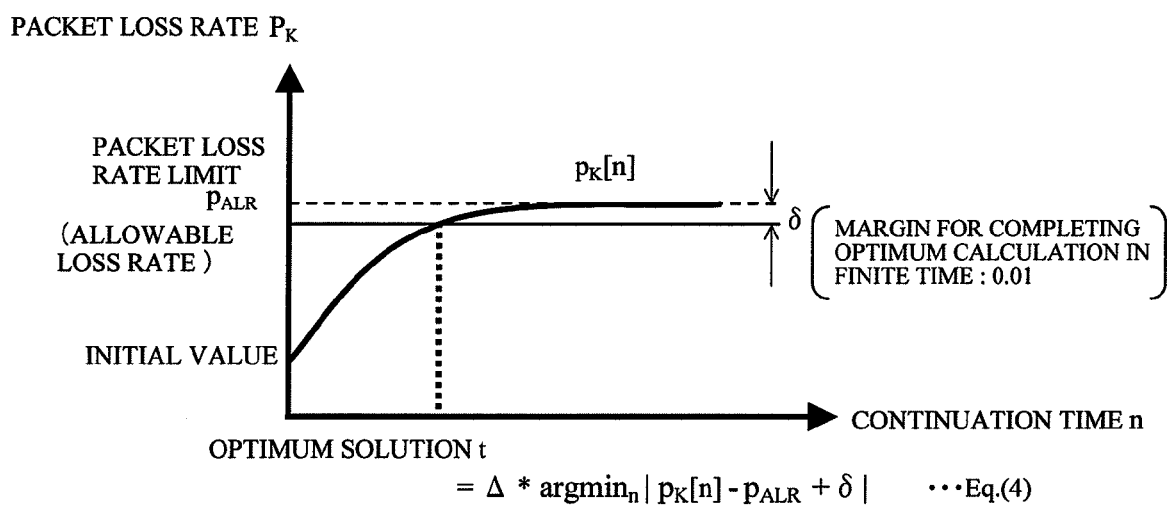
FIG. 8 is a graph showing a derivation example of an optimum short time interval "t" in the present invention.

As shown in FIG. 8, the present algorithm adopts the short time interval "t" satisfying the following evaluation function as an optimum value:

$$t=\Delta^* \text{argmin}_n |p_K[n]-p_{ALR}+\delta| \quad \text{Eq. (4)}$$

In Eq. (4), $p_K$ [n] indicates a packet loss rate in the short time interval "t"=n*Δ, $p_{ALR}$ indicates an allowable loss rate (0.0001), δ indicates a margin on the safe side for the allowable loss rate, where "n" which minimizes the value within | | ("n" closest to 0) is obtained. Namely, for a margin δ for completing an optimum calculation in a finite time, 0.01 is used to determine the short time interval "t" in which the simulation of Eq. (2) reaches a lower value by the margin δ than the packet loss rate limit $p_{ALR}$ as an optimum solution.

As the result of FIG. 5D, the short time interval "t"=0.12 sec is determined from the above-mentioned Eq. (4). Thus, when the mean bandwidth calculated in the time interval "t" shorter than 0.12 sec is 86.75%, the packet loss impact is small. Meanwhile, when the mean bandwidth is calculated in the time interval "t" longer than 0.12 sec, the packet loss impact will reach the allowable loss rate 0.0001.

Accordingly, the bandwidth measuring device of this embodiment monitors the mean load calculated in the short time interval "t"=0.12 sec so as not to approach the bandwidth limit $\rho_T$=86.75%.

Figure 10:
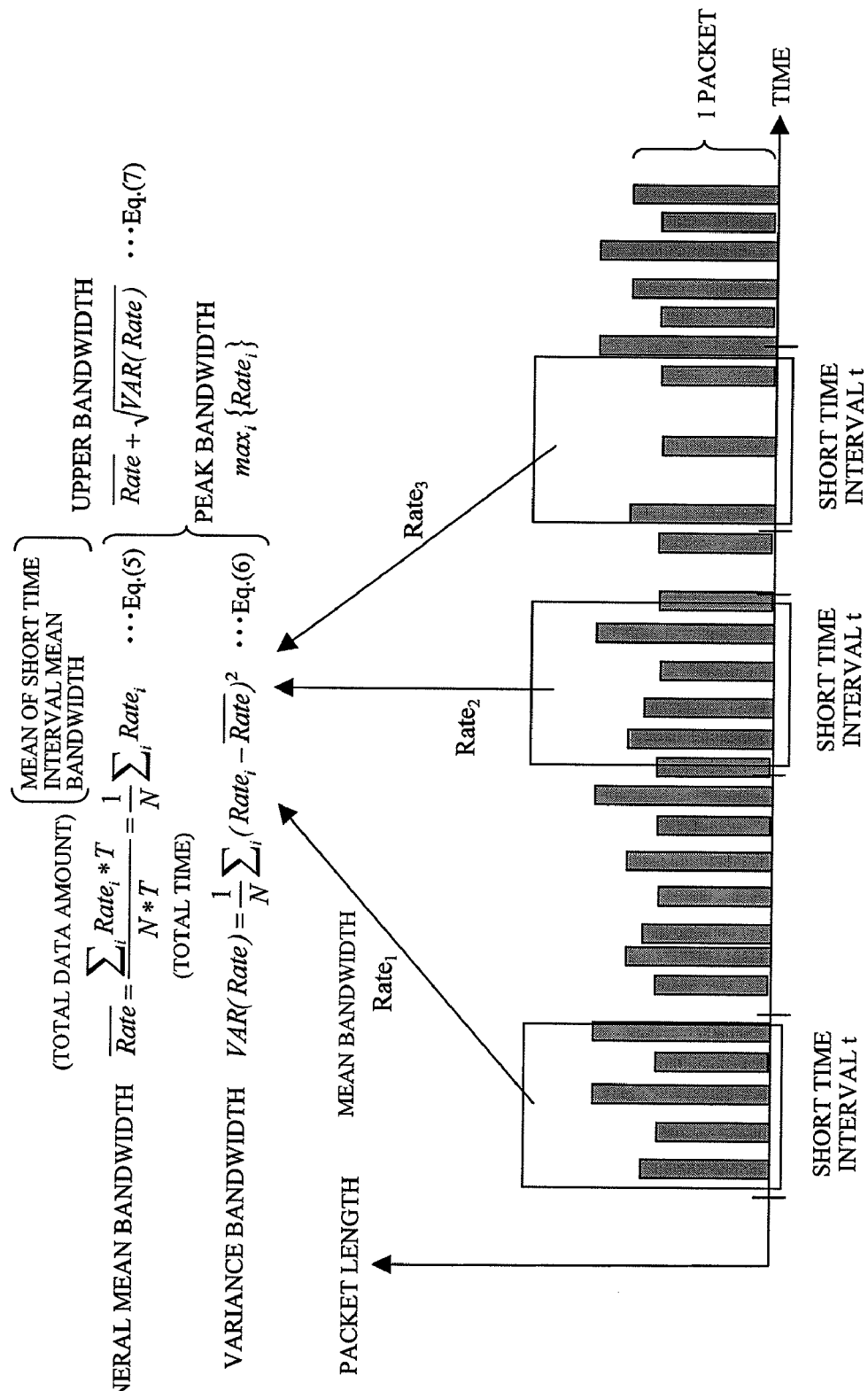
FIG. 10 is a graph for illustrating random bandwidth sampling in the present invention.

Random Bandwidth Sampling: Steps S8, S9 and FIGS. 10, 11

The above mentioned continuous packet capturing is performed in the short time interval "t", so that the mean bandwidth within the section is calculated. Furthermore, by repeating the continuous packet capturing at random, a general mean bandwidth change and a local bandwidth change can be grasped.

1) General Mean Bandwidth (Step S8)

A general mean bandwidth (Rave in FIG. 11) is calculated in accordance with the following equation with respect to the mean bandwidth $Rate_i$ (see FIG. 10) obtained in each short time section "t":

$$\overline{\text{Rate}} = \frac{\sum_i Rate_i * T}{N*T} = \frac{1}{N}\sum_i Rate_i \quad \text{Eq. (5)}$$

2) Local Bandwidth (Step S9)

Figure 11:
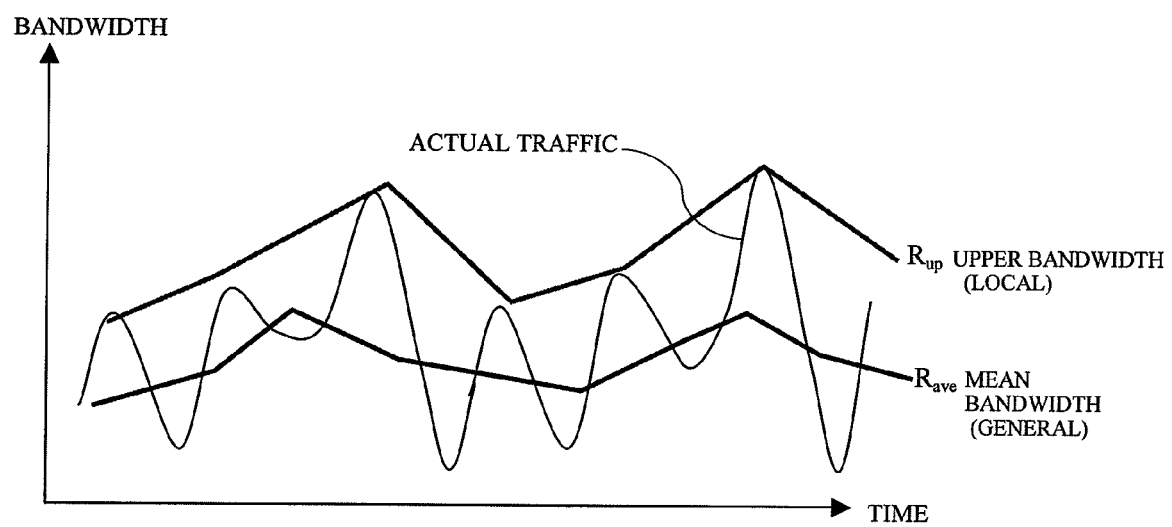
FIG. 11 is a waveform diagram showing a general and local bandwidth examples by the present invention.

A method of calculating a local behavior is indicated as follows:

Upper Bandwidth (Mean+Deviation) (Rup in FIG. 11)

A variance VAR (Rate) of the bandwidth with respect to the general mean bandwidth by the above-mentioned Eq. (5):

$$\text{VAR(Rate)} = \frac{1}{N}\sum_{i}(Rate_i - \overline{Rate})^2 \qquad \text{Eq. (6)}$$

By using Eq. (6), the upper bandwidth is calculated by the following equation:

$$\overline{Rate} + \sqrt{\text{VAR(Rate)}} \qquad \text{Eq. (7)}$$

Peak Bandwidth

The maximum bandwidth $\max_i\{Rate_i\}$ is extracted among the mean bandwidth $Rate_i$ obtained in each short time section "t".

Figure 12:
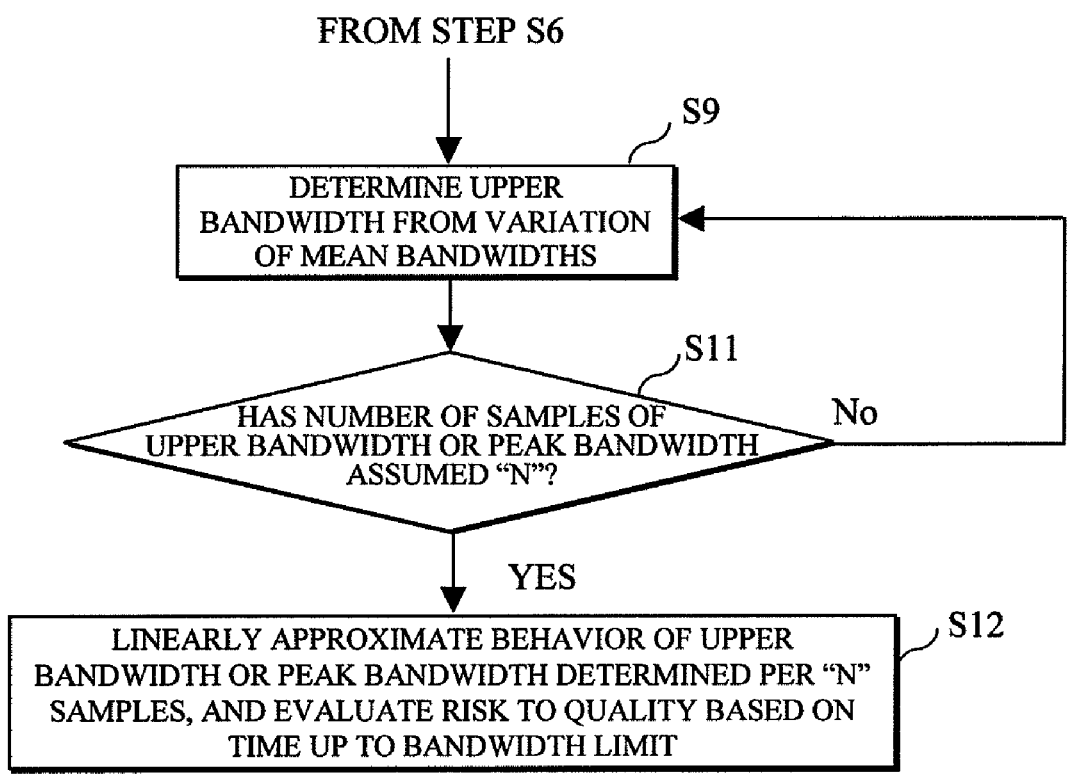
FIG. 12 is a flowchart showing prediction processing of a local bandwidth by the present invention.
Figure 13:
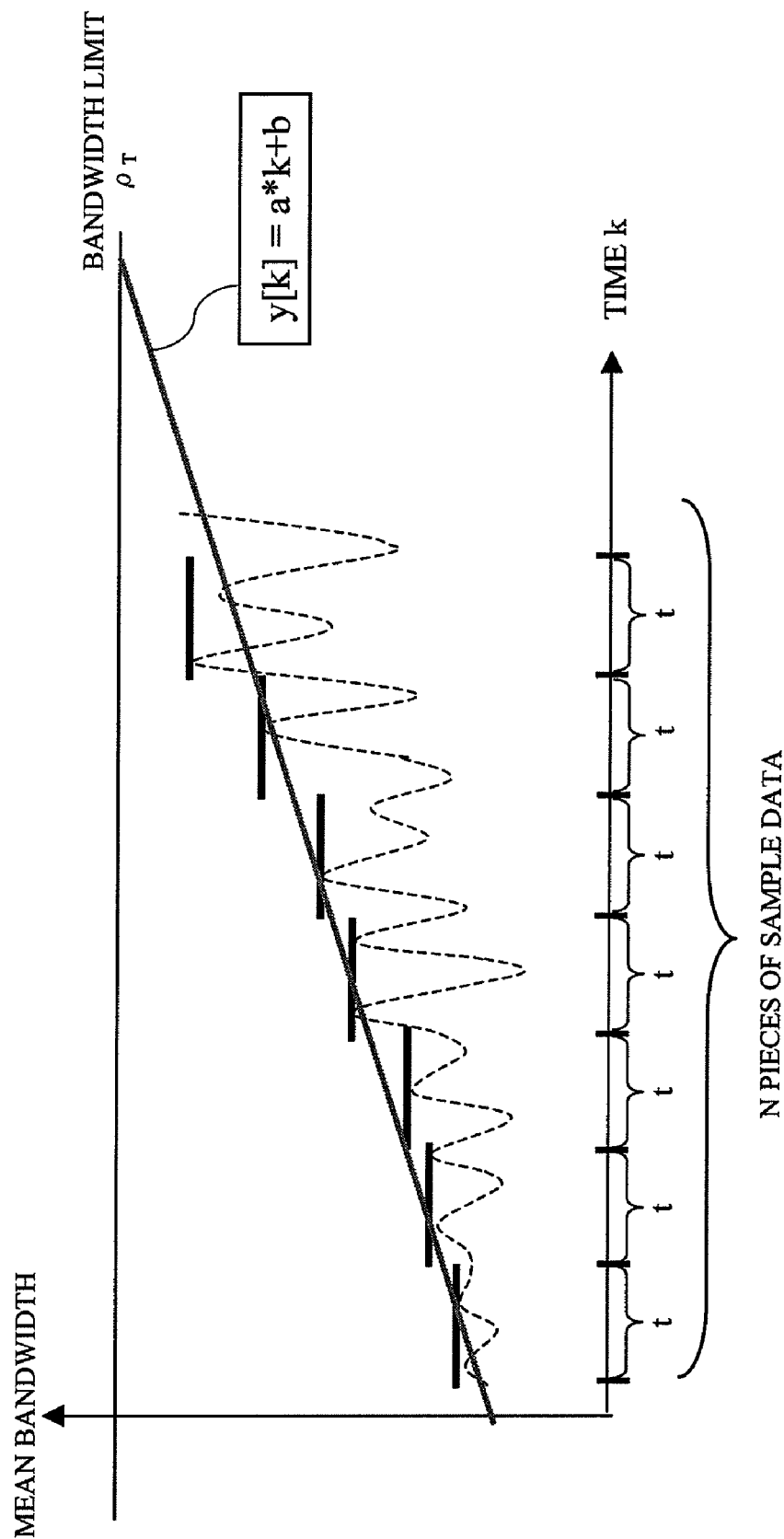
FIG. 13 is a graph showing a change prediction of an upper bandwidth or a peak bandwidth in FIG. 12.

Trend Prediction of Local Bandwidth: FIGS. 12 and 13

As shown in FIGS. 12 and 13, a linear approximate equation having the unit time "t" is determined from N samples of the local bandwidth calculated per certain designated time T to estimate a time further required to reach the bandwidth limit and to determine the risk toward the quality (at steps S11 and S12 in FIG. 12).

Setting of Control Trigger: Step S10

When the monitored local bandwidth reaches the bandwidth limit, or when it is determined as a result of the prediction that the monitored local bandwidth reaches the limit after a fixed time, an alarm is automatically given to a management system/operator.

1) Threshold Setting by Operator

Mean Bandwidth Threshold

How much margin on the safe side should be taken is considered for the bandwidth limit.

For example, 5% margin on the safe side is set for the load limit 86.75%.

⇒86.75*(1−0.05)=82.4% is set as a threshold.

Prediction Time Threshold

A time "x" up to reaching the bandwidth limit is set as a threshold.

Figures 14A, 14B, 14C:
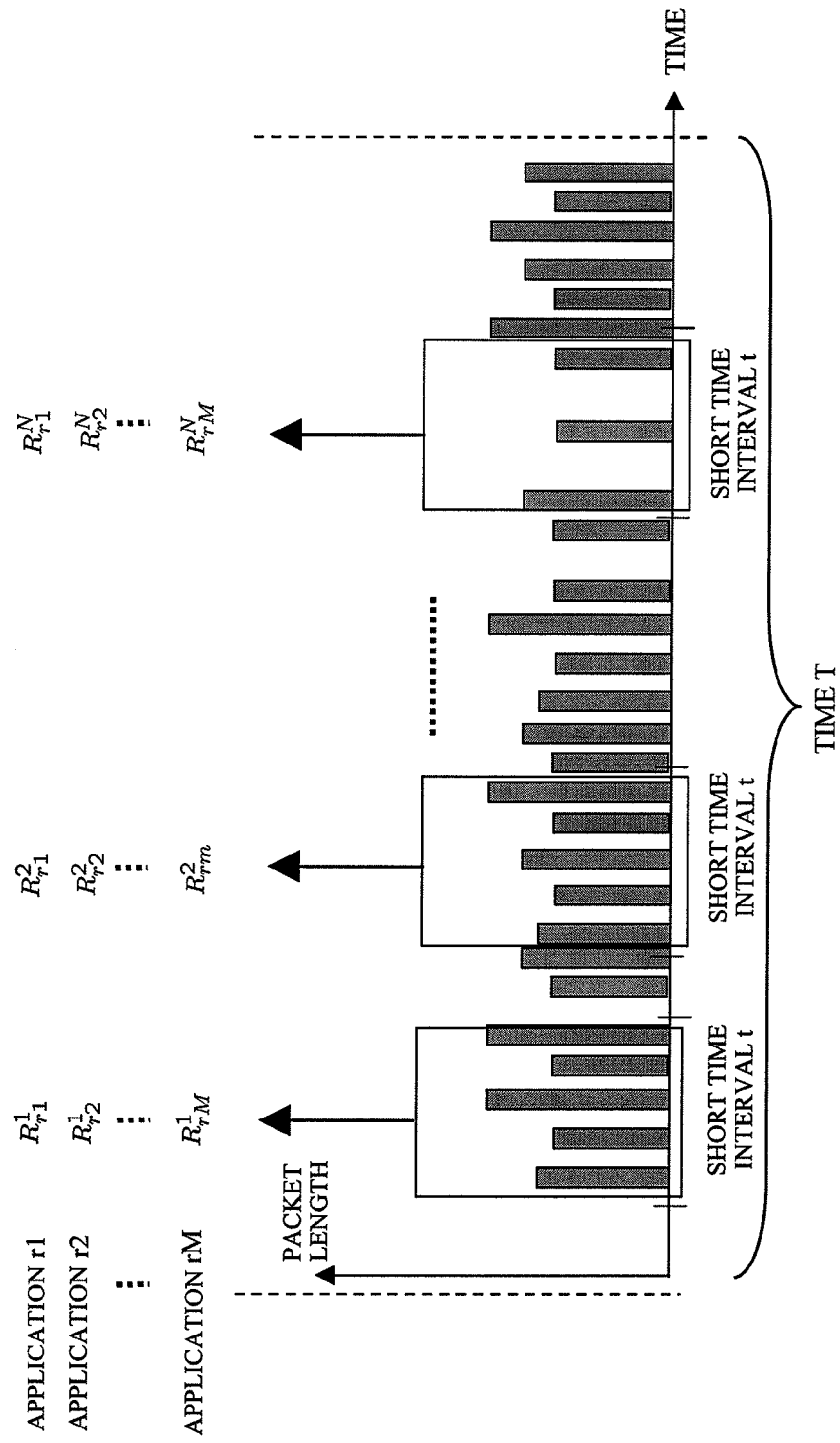
FIGS. 14A-14C are diagrams showing a bandwidth estimation example of each application by the present invention.

Bandwidth Estimation of Each Application Flow: FIGS. 14A-14C

A specific flow bandwidth (application) in the short time interval "t" upon "i-th" sampling is supposed:

$$R_r^i \qquad \text{Eq. (8)}$$

From Eq. (8), a general mean bandwidth (FIG. 14A) of a specific flow "r" is derived as the following equation:

$$\overline{Rate_r} = \frac{\sum_{i}^{N} R_r^i}{N} \qquad \text{Eq. (9)}$$

Also, as a local bandwidth of the specific flow "r", the upper bandwidth (FIG. 14B) is expressed by the following equation:

$$\overline{Rate_r} + \sqrt{\frac{\sum_{i}^{N}(R_r^i - \overline{Rate_r})^2}{N}} \qquad \text{Eq. (10)}$$

Furthermore, the peak bandwidth (FIG. 14C) is expressed by the following equation:

$$\max_i\{R_r^i\} \qquad \text{Eq. (11)}$$

It is to be noted that the present invention is not limited by the above-mentioned embodiments, and it is obvious that various modifications may be made by one skilled in the art based on the recitation of the claims. Also, it is obvious for one skilled in the art that a program for making a computer execute a bandwidth measuring method according to the present invention, and a computer readable recording medium for recording the program are included in the modifications.

What is claimed is:

1. A bandwidth measuring method in a first node comprising:
   determining an initial value of a transient evaluation type queue simulation for a packet loss rate by determining a bandwidth limit based on a buffer length, a transmission bandwidth, and a mean packet length collected in second node adjoining the first node or in the first node itself and information of a preset allowable packet loss rate, and executing the simulation; and
   determining an optimum short time interval when the packet loss rate by the simulation approaches the allowable packet loss rate as a packet continuous capture time.

2. The bandwidth measuring method as claimed in claim 1, further comprising continuously capturing packets in the short time interval to calculate a mean bandwidth of the packets, repeating the continuous capture at random within a fixed section, and determining a general mean bandwidth or a local upper bandwidth or peak bandwidth from an overall mean bandwidth determined within the fixed section.

3. The bandwidth measuring method as claimed in claim 2, wherein the general mean bandwidth comprises an arithmetic mean value of the overall mean bandwidth, and the upper bandwidth or the peak bandwidth comprises a value determined from a variation of the overall mean bandwidth.

4. The bandwidth measuring method as claimed in claim 2, further comprising determining a risk for the bandwidth limit by performing linear approximate prediction to a temporal transition of the upper bandwidth or the peak bandwidth.

5. The bandwidth measuring method as claimed in claim 2, further comprising notifying that a change of the upper bandwidth or the peak bandwidth has reached a bandwidth limit which can not satisfy the allowable packet loss rate.

6. The bandwidth measuring method as claimed in claim 1, further comprising calculating a bandwidth change per individual application flow from header information of the captured packet.

7. A bandwidth measuring device in a first node comprising:
   a first determining portion determining an initial value of a transient evaluation type queue simulation for a packet loss rate by determining a bandwidth limit based on a buffer length, a transmission bandwidth, and a mean packet length collected in a second node adjoining the first node or in the first node itself and information of a preset allowable packet loss rate, and executing the simulation; and
   a second determining portion determining an optimum short time interval when the packet loss rate by the simulation approaches the allowable packet loss rate as a packet continuous capture time.

8. The bandwidth measuring device as claimed in claim 7, further comprising a capturing portion continuously capturing packets in the short time interval to calculate a mean bandwidth of the packets, a repeating portion repeating the continuous capture at random within a fixed section, and a determining portion determining a general mean bandwidth or a local upper bandwidth or peak bandwidth from an overall mean bandwidth determined within the fixed section.

9. The bandwidth measuring device as claimed in claim 8, wherein the general mean bandwidth comprises an arithmetic mean value of the overall mean bandwidth, and the upper bandwidth or the peak bandwidth comprises a value determined from a variation of the overall mean bandwidth.

10. The bandwidth measuring device as claimed in claim 8, further comprising a determining portion determining a risk for the bandwidth limit by performing linear approximate prediction to a temporal transition of the upper bandwidth or the peak bandwidth.

11. The bandwidth measuring device as claimed in claim 8, further comprising a notifying portion notifying that a change of the upper bandwidth or the peak bandwidth has reached a bandwidth limit which can not satisfy the allowable packet loss rate.

12. The bandwidth measuring device as claimed in claim 7, further comprising a calculator calculating a bandwidth change per individual application flow from header information of the captured packet.

13. A non-transitory computer readable recording medium with a computer program recorded thereon, wherein the computer program causes a computer to execute in a first node:
  determining an initial value of a transient evaluation type queue simulation for a packet loss rate by determining a bandwidth limit based on a buffer length, a transmission bandwidth, and a mean packet length collected in a second node adjoining the first node or in the first node itself and information of a preset allowable packet loss rate, and executing the simulation; and
  determining an optimum short time interval when the packet loss rate by the simulation approaches the allowable packet loss rate as a packet continuous capture time.

14. The non-transitory computer readable recording medium with the computer program recorded thereon as claimed in claim 13, wherein the computer program causes the computer to further execute continuously capturing packets in the short time interval to calculate a mean bandwidth of the packets, repeating the continuous capture at random within a fixed section, and determining a general mean bandwidth or a local upper bandwidth or peak bandwidth from an overall mean bandwidth determined within the fixed section.

* * * * *